United States Patent [19]

Hoshi

[11] Patent Number: 4,655,310

[45] Date of Patent: Apr. 7, 1987

[54] AUTOMOTIVE VEHICLE

[75] Inventor: Norio Hoshi, Wako, Japan

[73] Assignee: Honda Giken Kogyo Kabushiki Kaisha, Japan

[21] Appl. No.: 814,542

[22] Filed: Dec. 30, 1985

[30] Foreign Application Priority Data

Jan. 12, 1985 [JP] Japan .................................. 60-3719

[51] Int. Cl.$^4$ ............................................. B62K 25/20
[52] U.S. Cl. ..................................... 180/219; 180/227
[58] Field of Search ....................... 180/227, 231, 219; 280/284

[56] References Cited

U.S. PATENT DOCUMENTS

| 439,095 | 10/1890 | Becker | 280/284 X |
| 4,039,200 | 8/1977 | McGonegle | 180/227 |
| 4,356,877 | 11/1982 | Kamiya | 180/227 |
| 4,553,622 | 11/1985 | De Cortanze | 180/227 |

FOREIGN PATENT DOCUMENTS 1037947 9/1953 France ................................ 180/227

Primary Examiner—John A. Pekar
Attorney, Agent, or Firm—Darby & Darby

[57] ABSTRACT

An automotive vehicle includes an engine mounted on a frame and including a rotatable drive sprocket fixedly mounted on the drive shaft fixedly mounted on the drive shaft. A rear wheel suspension device includes a generally horizontally-disposed swing arm supporting a rear wheel at one end thereof, the swing arm extending along the length of frame. An endless transmission member is extended around and engaged with the drive sprocket and a driven sprocket, secured to the rear wheel, for driving the rear wheel. A bearing device is mounted on the frame and includes a bearing member pivotally supporting the other end of the swing arm for allowing it to be swung vertically about an axis which is disposed rearwardly of the drive shaft in generally parallel relation thereto. The bearing member is spaced from the drive sprocket in the direction of the width of the frame and is disposed in overlapping relation thereto in the direction of the length of the frame in such a manner that the other end of the swing arm and the bearing member will not interfere with the drive sprocket.

5 Claims, 6 Drawing Figures

AUTOMOTIVE VEHICLE

BACKGROUND OF THE INVENTION

1. Field of the Invention

This invention relates generally to automotive vehicles such as a motorcycle and more particularly to a rear wheel suspension device.

2. Prior Art

One conventional motorcycle 10 shown in FIGS. 1 and 2 comprises a rear wheel suspension device 12 mounted on a frame 14. The suspension device 12 comprises a swing arm 16 extending along the length of the frame 14 and supporting a rear wheel 18 at a rear end thereof, and bearing means 20 mounted on the frame 14 and pivotally supporting a front end of the swing arm 16 for allowing a swinging movement thereof. The rear wheel suspension device 12 further comprises a cushioning means 22 which comprises a shock absorber 22a, extending between an upper portion of the frame 14 and the swing arm 16, and a coil spring 22b wound around the shock absorber 22a. The swing arm 12 is disposed rearwardly of an engine 24 including a drive shaft 26 having one end extending exteriorly of a body thereof. A drive sprocket 28 is fixedly mounted on the one end of the drive shaft 26, and an endless transmission member 30 such as a chain and a belt is extended between the drive sprocket 28 and a driven sprocket 32 fixedly mounted on the rear wheel 18. The bearing means 20 comprises a pair of roller bearing members 34a and 34b mounted respectively on a pair of parallel spaced loop portions 14a and 14a of the frame 14 through respective mounting plates 36 and 36 and a mounting shaft 38 which extends through the bearing members 34a and 34b and the mounting plates 36 and 36. The front end of the swing arm 16 is bifurcated to provide a pair of spaced arms 16a and 16a secured to the pair of bearing members 34a and 34b, respectively. As best shown in FIG. 2, the bearing member 34a is disposed rearwardly of the drive sprocket 32 and is disposed in registry therewith in the direction of the length of the frame 14. The endless chain 30 is swung vertically about the drive shaft 26 when the swing arm 16 is swung vertically about the axes of the bearing members 34a and 34b. The drive shaft 26 and the bearing members 34a and 34b are considerably spaced from each other in the direction of the length of the frame 14, so that as the vertical movement of the rear wheel 18 increases, the tension of the endless chain 30 is considerably varied. In addition, in motorcycles, it is desired to mount the engine on the frame rearwardly as much as possible to obtain a good weight distribution of the motorcycle without reducing the length of the swing arm. And, it is also desired to increase the length of the swing arm as much as possible without changing a wheel base so as to make the layout of the suspension device less limited. To achieve these, it is necessary to reduce the spacing between the drive shaft 26 and the bearing members 34a and 34b. With the conventional motorcycle 10, this spacing can not be reduced adequately because of a possible interference of the bearing member 34a with the engine body and the drive sprocket 26.

SUMMARY OF THE INVENTION

It is therefore an object of this invention to provide a motorcycle having an improved rear wheel suspension device whereby the tension of the endless chain is not varied unduly during the running of the motorcycle, and a better weight distribution of the motorcycle is achieved, and the swing arm can be increased in length without affecting the performance of the rear wheel suspension so as to make the layout of the rear wheel suspension device less limited.

According to the present invention, there is provided an automotive vehicle comprising:

(a) an elongated frame having front and rear ends;

(b) an engine mounted on said frame and including a body and a drive shaft mounted on said body for rotation about an axis thereof and extending transversely of said frame, said drive shaft having one end extending exteriorly of said body, said drive shaft having a drive sprocket fixedly mounted on said one end thereof for rotation therewith about an axis thereof, (c) front wheel means supported on said frame;

(d) rear wheel means including at least one rear wheel and a driven sprocket fixed to said rear wheel;

(e) rear wheel suspension means comprising a generally horizontally-disposed swing arm supporting said rear wheel means at one end thereof, said swing arm extending along the length of said frame;

(f) an endless transmission member extended around and engaged with said drive and driven sprockets for driving said rear wheel upon rotation of said drive sprocket, said transmission member being disposed along the length of said frame; and (g) bearing means mounted on said frame, said bearing means comprising a bearing member pivotally supporting the other end of said swing arm for allowing it to be swung vertically about an axis which is disposed rearwardly of said drive shaft in generally parallel relation thereto, said bearing member being spaced form said drive sprocket in the direction of the width of said frame and disposed in overlapping relation thereto in the direction of the length of said frame in such a manner that said other end of said swing arm and said bearing member will not interfere with said drive sprocket.

DESCRIPTION OF THE PREFERRED EMBODIMENTS OF THE INVENTION

Figure 3:
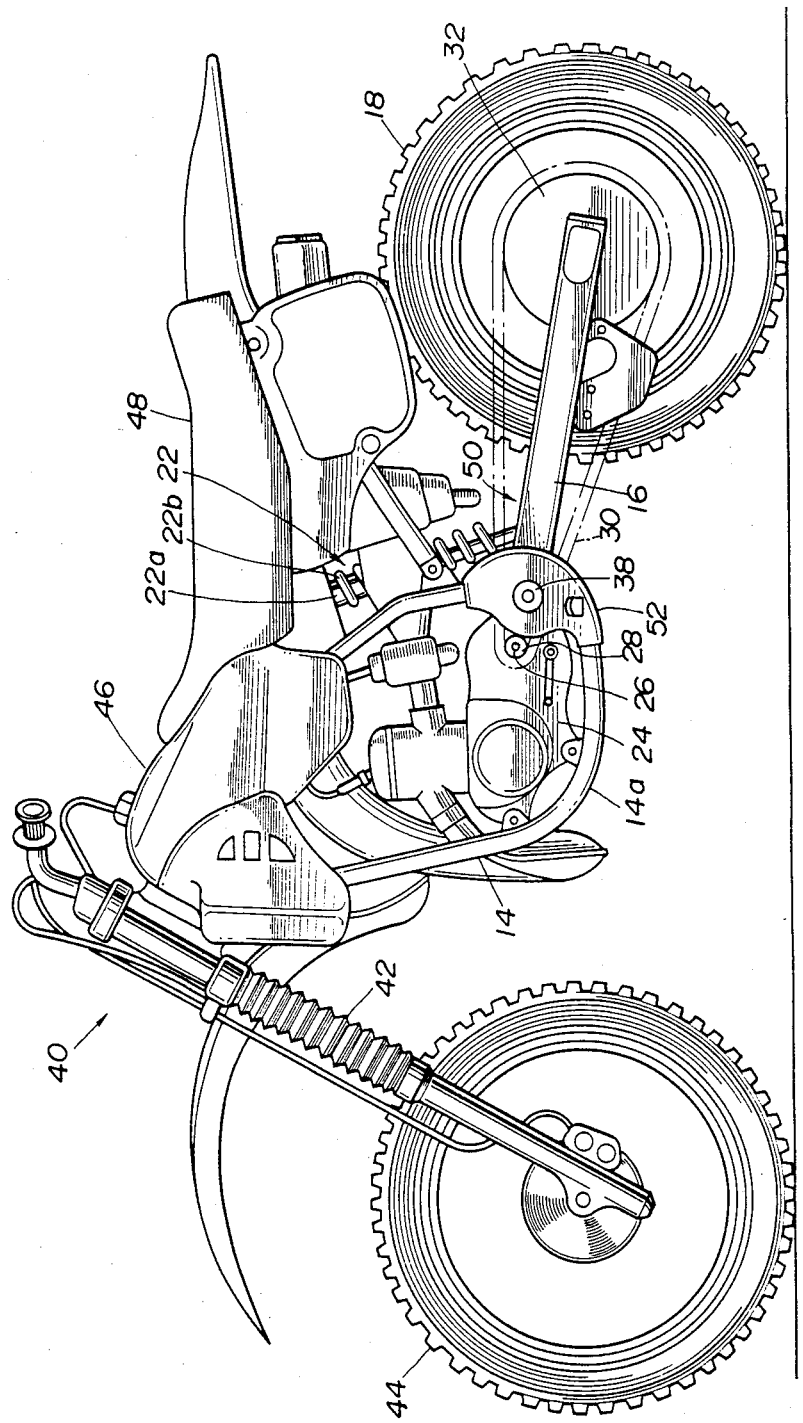
FIG. 3 is a side-elevational view of a motorcycle provided in accordance with the present invention.

A motorcycle 40 shown in FIG. 3 comprises an elongated frame 14 including a front fork 42 supporting a front wheel 44, an engine 24 mounted on the frame 14, a fuel tank 46 mounted on the frame 14 above the engine 24, a seat 48 mounted on the frame 14, and a rear wheel suspension device 50. The suspension device 50 comprises a swing arm 16 extending generally horizontally along the length of the frame 14 and supporting a rear wheel 18 at a rear end thereof, bearing means 20 (FIG. 4) mounted on the frame 14 and pivotally supporting a front end of the swing arm 16 for allowing a vertical swinging movement thereof, and a cushioning means 22 which comprises a shock absorber 22a extending between an upper portion of the frame 14 and the swing arm 16, and a coil spring 22b wound around the shock absorber 22a.

The engine 24 comprises a body 24a and a drive shaft 26 extending transversely of the frame 14 and having one end extending exteriorly of the body 24a, the drive shaft 26 being rotatable about an axis thereof. A drive sprocket 28 is fixedly mounted on the one end of the drive shaft 26 for rotation therewith and is disposed in a vertical plane in the direction of the length of the frame 14. The rear wheel 18 has a driven sprocket 32 fixedly secured thereto and disposed in the plane in which the drive sprocket 28 lies. An endless transmission member 30 in the form of an endless chain is extended between and engaged with the drive sprocket 28 and the driven sprocket 32, so that the rear wheel 18 is driven for rotation upon rotation of the drive shaft 26.

Figure 4:
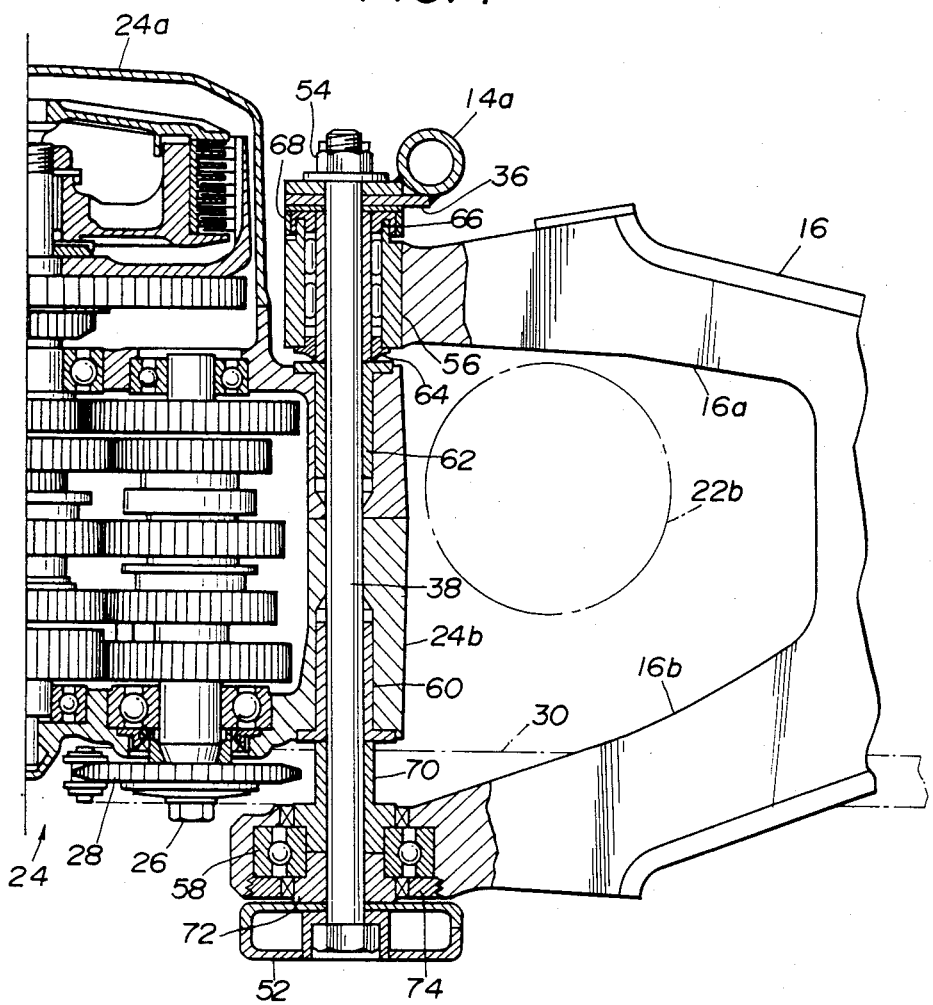
FIG. 4 is a horizontal cross-sectional view of a portion of the motorcycle of FIG. 3.

As shown in FIG. 4, a mounting plate 36 is fixedly secured to a vertically-disposed portion 14a of the frame 14, and an elongated hollow member 52 of a rectangular crosssection is secured to the frame 14 at opposite ends thereof. A rear end portion 24b of the engine body 24a is disposed between the mounting plate 36 and the hollow member 52. A mounting shaft 38 is disposed rearwardly of the drive shaft 25 in parallel relation thereto and extends through the hollow member 52, the rear portion 24b of the engine body 24a and the mounting plate 36, and a nut 54 is threaded on one end of the mounting shaft 38 projecting outwardly of the mounting plate 36 to thereby fix the mounting plate 36 relative to the mounting plate 36 and the hollow member 52. The mounting shaft 38 extends transversely of the frame 14. A roller bearing 56 is angularly movably mounted on the mounting shaft 38 adjacent to the mounting plate 36 while a radial ball bearing 58 of a relatively small width is angularly movably mounted on the mounting shaft 38 adjacent to the hollow member 52. The front end of the swing arm 16 is bifurcated to provide a pair of spaced arms 16a and 16b. One arm 16a is fixedly secured to the roller bearing 56 at a front end thereof while the other arm 16b is mounted on the ball bearing 58. The other arm 16b projects forwardly of the one arm 16a and disposed outwardly of the drive sprocket 28. A pair of bushings 60 and 62 are fitted on the mounting shaft 38 and are received in the rear portion 24b of the engine body 24a. A ring 64 is interposed between the bushing 62 and the roller bearing 56, and ring members 66 and 68 are interposed between the roller bearing 56 and the mounting plate 36. A spacer 70 is interposed between the bushing 60 and the ball bearing 58. A bushing 72 and a threaded ring 74 are interposed between the spacer 70 and the hollow member 52.

Figure 1:
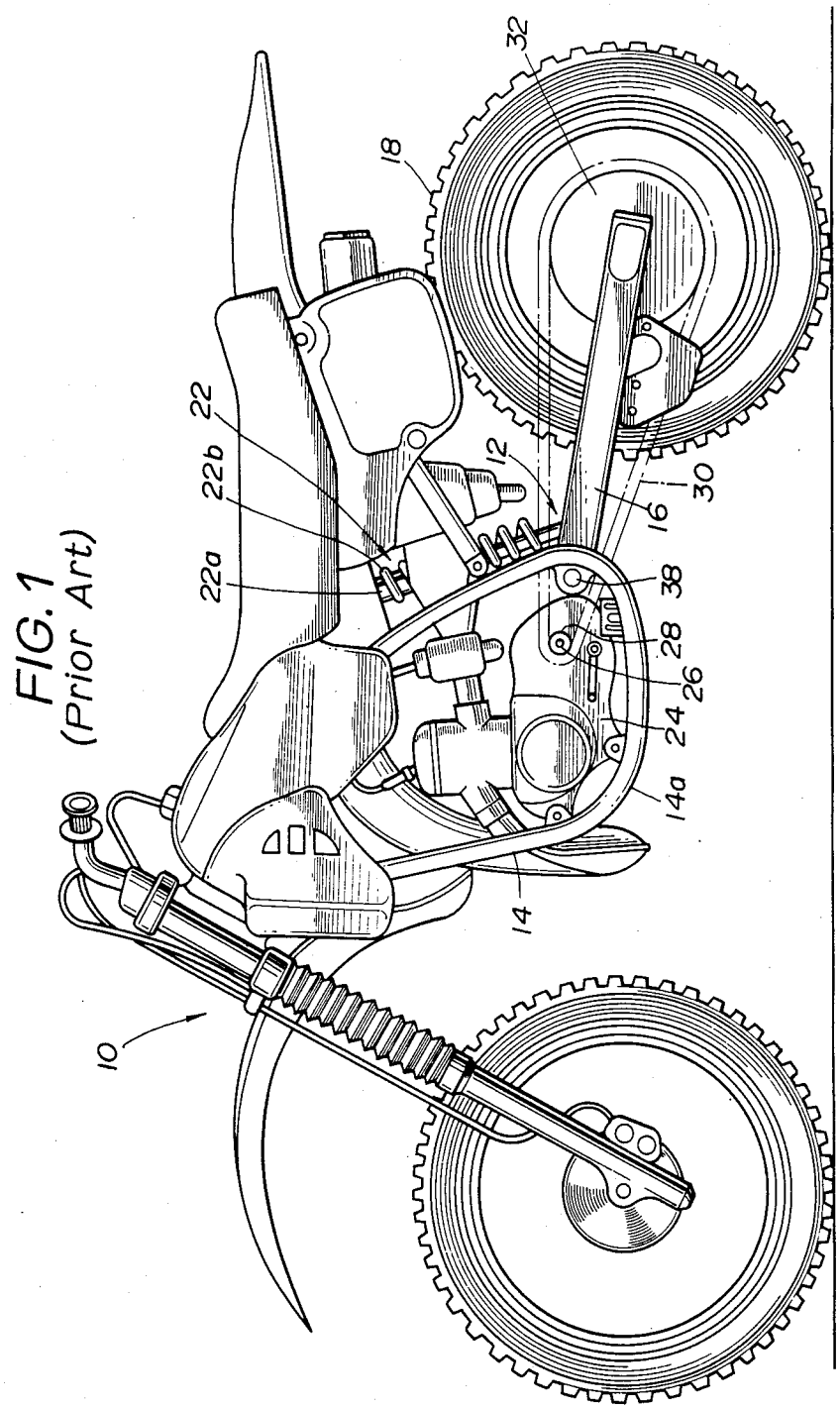
FIG. 1 is a side-elevational view of a motorcycle provided in accordance with the prior art.
Figure 2:
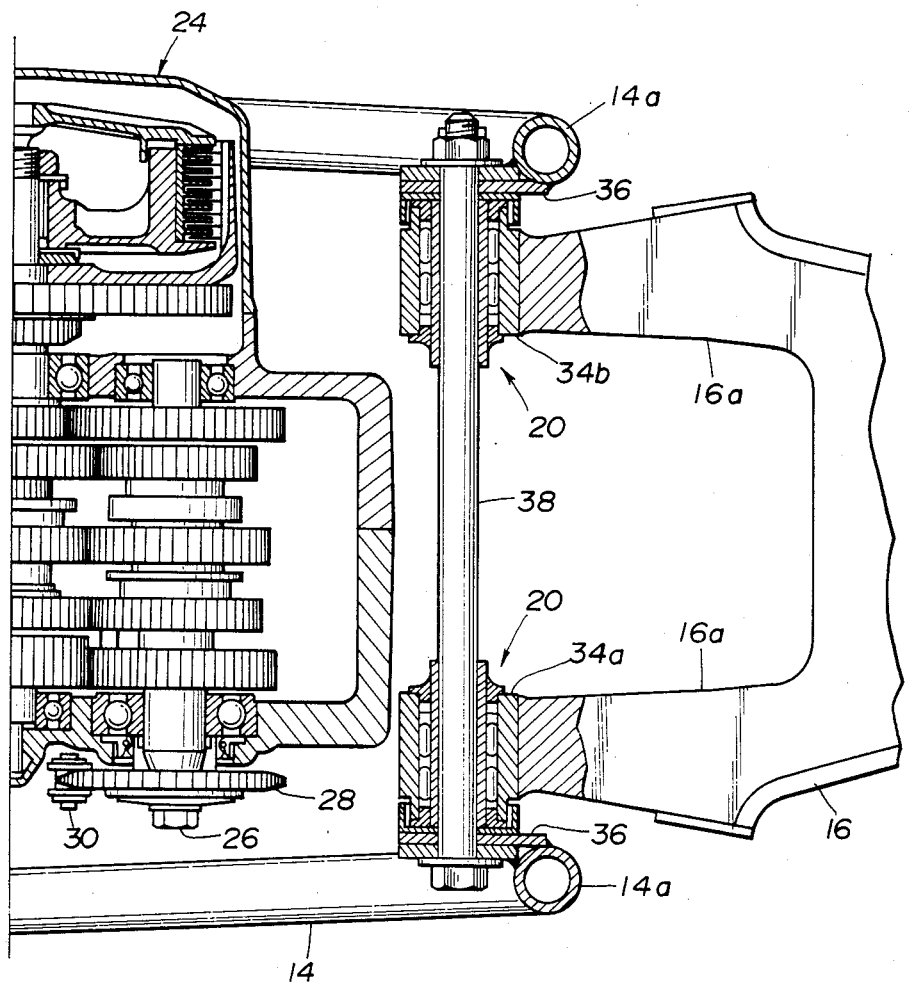
FIG. 2 is a horizontal cross-sectional view of a portion of the motorcycle.

The ball bearing 58 is spaced outwardly form the drive sprocket 28 in the direction of the width of the frame 14 and is disposed in overlapping relation thereto in the direction of the length of the frame 14 in such a manner that the arm 16b of the swing arm 16 and the ball bearing 58 will not interfere with the drive sprocket 28. Therefore, The ball bearing 58 is also disposed outwardly of the vertical plane in which the endless chain 30 is disposed. With this arrangement, the spacing between the drive shaft 26 and the the ball bearing 58 can be reduced considerably, and the spacing between the drive shaft 26 and the axes of the bearing members 56 and 58, that is to say, the axis of the mounting shaft 38, is reduced, so that a variation in the tension of the endless chain 30 is kept to a low level when the rear wheel 18 is subjected to vertical swinging movement during the running of the motorcycle 40. Therefore, as compared with the conventional motorcycle 10 shown in FIGS. 1 and 2, the position of mounting of the engine 24 can be shifted rearwardly by a distance equal to the amount of reduction of suspension is less limited. Further, since the spacing between the ball bearing 58 and the rear wheel is relatively large, the layout of associated parts to be mounted in this spacing is less limited. Further, since the mounting shaft 38 extends through the rear portion 24b of the engine body 24, the rigidity of the rear suspension device is enhanced.

Figure 5:
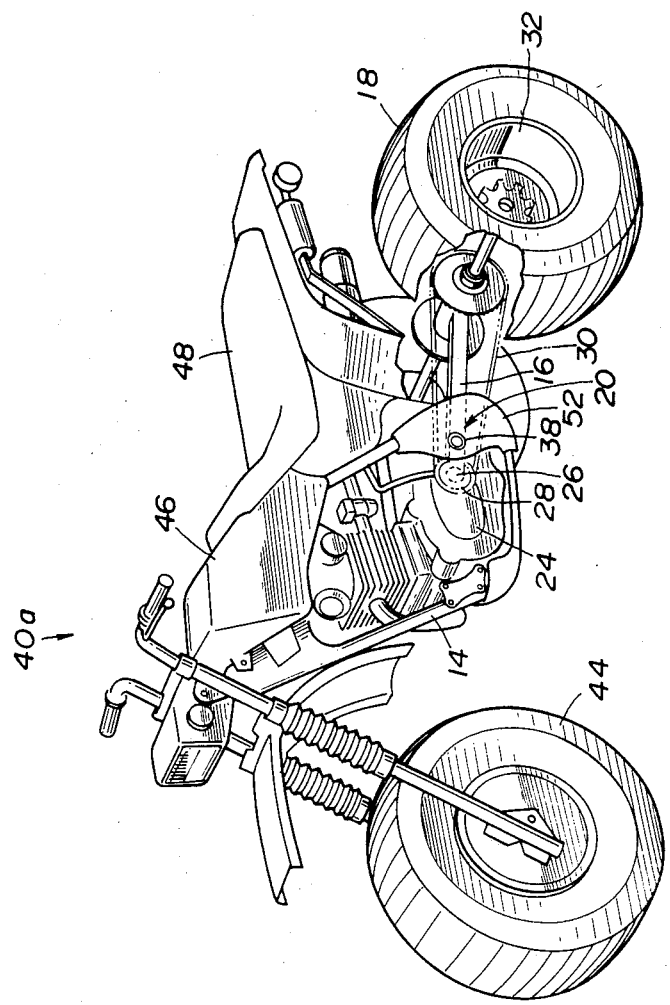
FIG. 5 is a perspective view of a modified motorcycle comprising three wheels.
Figure 6:
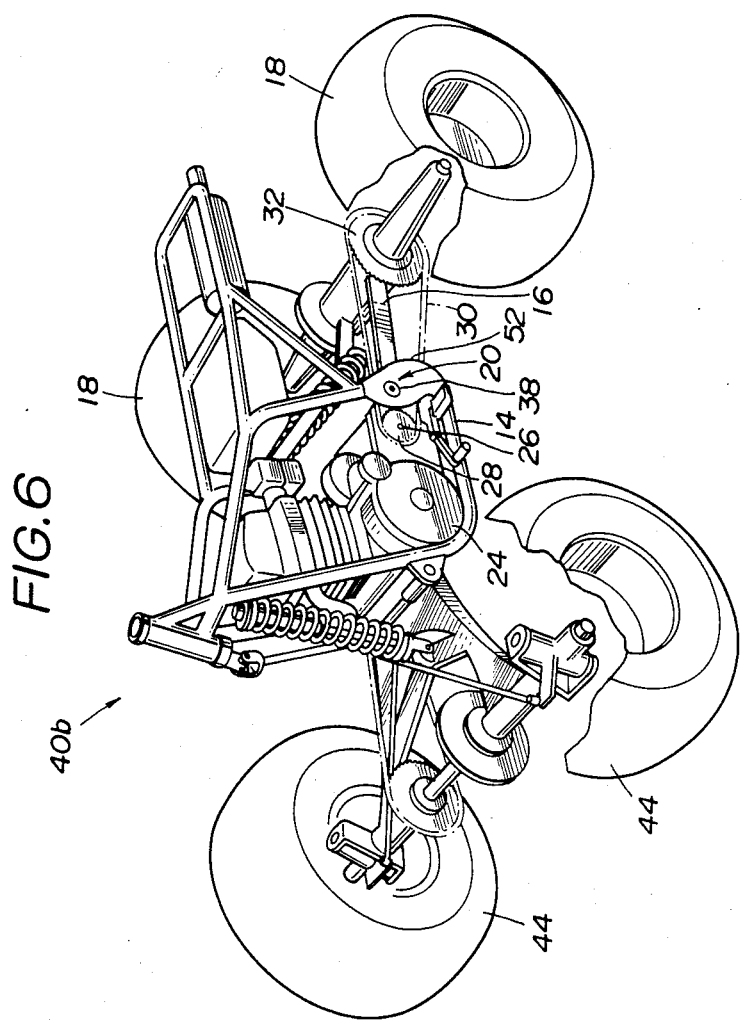
FIG. 6 is a perspective view of another modified motorcycle comprising four wheels, with parts omitted.

The present invention can also be applied to other automotive vehicles or motorcycles of the type having more than two wheels in which rear wheel or wheels are driven for rotation through an endless chain or the like, such motorcycles being often referred to as "buggy" in the trade. FIG. 5 shows a motorcycle 40a having one front wheel 44 and two rear wheels 18, and FIG. 6 shows a motorcycle 40b having two front wheels 44 and two rear wheels 18. Each of the motorcycles 40a and 40b includes bearing means 20 as described above for the preceding embodiment of FIGS. 3 and 4.

What is claimed is:

1. An automotive vehicle comprising:
   (a) an elongated frame having front and rear ends;
   (b) an engine mounted on said frame and including a body having opposite sides spaced from each other transversely of said frame and a rearwardly extending projection portion, a drive shaft mounted on said body for rotation about an axis extending transversely of said frame and having one end extending exteriorly of one of said oppostie sides of said body adjacent to said projection portion, and a drive sprocket mounted on said one end of said shaft for rotation therewith;
   (c) front wheel means supported on said frame;
   (d) rear wheel means including at least one rear wheel and a driven sprocket fixed to said rear wheel;
   (e) rear wheel suspension means comprising a generally horizontally-disposed swing arm extending along the length of said frame and supporting said rear wheel for rotation at the other end of said swing arm, theother end of said swing arm being bifurcated to provide first and second arm portions spaced from each other transversely of said frame;
   (f) an endless transmission member extending around and engaged with said drive and driven sprockets for driving said rear wheel upon rotation of said drive sprocket, said transmission member being disposed along the length of said frame;
   (g) bearing means mounted on said frame and comprising a mounting shaft extending transversely of said frame through said engine body projection portion, and first and second bearing members mounted for angular movement on said mounting shaft and spaced along the length thereof, said first and second arm portions of said swing arm being mounted respectively on said first and second bearings for allowing said swing arm to be pivoted about said mounting shaft, said first bearing member being disposed transversely outwardly of said one side of said body and said drive sprocket and being in overlapping relation to said drive sprocket in the direction of the length of said frame in such a manner that said other end of said swing arm and said first bearing member will not interfere with said drive sprocket.

2. An automotive vehicle according to claim 1 in said first bearing member comprises a radial ball bearing.

3. An automotive vehicle according to claim 1, in which said second bearing member is disposed inwardly of the other side of said engine body.

4. In an automotive vehicle of the type including a frame having front and rear ends, an engine mounted on said frame, said engine having with opposite lateral surfaces and a drive sprocket disposed towards the rear of said housing adjacent a first of said lateral surfaces, a rear wheel assembly, a rearwardly extending wheel suspension arm supporting the rear wheel assembly at a rear end thereof and having a bifurcated front end defined by first and second laterally-spaced arm portions, and a transmission member coupling the drive sprocket to the rear wheel assembly, the improvement comprising:

said automotive housing having a rearwardly extending projection portion having a first lateral surface which is substantially flush with the first lateral surface of said housing, a second lateral surface recessed from the second lateral surface of the housing by an amount at least equal to the lateral extnet of the second arm portion of said swing arm; and means for mounting said first and second arm portions to said housing projection portion for pivotal movement with respect thereto, said mounting means including means for spacing said first arm portion laterally outwardly with respect to said drive sprocket, said mounting means mounting said first and second arm portions so as to overlap said drive sprocket in the direction of the length of said frame with said first arm portion abutting said second lateral surface of said projection portion.

5. An automotive vehicle in accordance with claim 4 wherein said mounting means comprises a transversely disposed shaft having first and second ends mounted to said frame, said shaft extending through said first and second arm portions and said projection portion of said housing, said first and second arm portions being journaled on said shaft.

* * * * *